Dec. 6, 1938.  F. P. GOHOREL  2,139,117
DELAYED SIGNALING SYSTEM
Filed Oct. 31, 1935
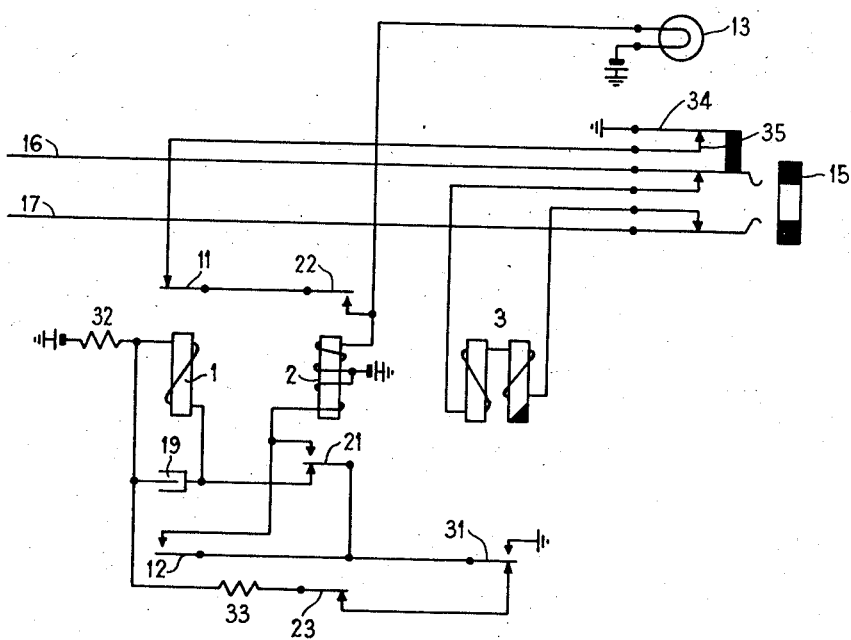
INVENTOR.
FERNAND PIERRE GOHOREL
BY
*R S Richardson*
ATTORNEY.

Patented Dec. 6, 1938

2,139,117

UNITED STATES PATENT OFFICE 2,139,117

DELAYED SIGNALING SYSTEM

Fernand Pierre Gohorel, Paris, France, assignor, by mesne assignments, to Associated Electric Laboratories, Inc., Chicago, Ill., a corporation of Delaware Application October 31, 1935, Serial No. 47,562
In France December 13, 1934

5 Claims. (Cl. 175—320)

The present invention concerns an apparatus for delayed signaling, and more particularly an apparatus for delayed signaling over telephone lines. As applied to a telephone line, the object of the invention is to insure that the line signal will not operate unless signaling current is received over a period which is equal to or longer than a predetermined period.

The invention is characterized by a combination of relays and by a condenser, the presence of the condenser at the extremities of the windings of one of the relays having the effect that the operation of the signaling system is only promoted in the case in which the transmission of the signaling current over the line has a predetermined duration which depends upon the value adopted for the time constant of the condenser circuit.

Another characteristic of the invention resides in using both the time taken by the condenser to charge, and also to discharge, with a view to obtaining a greater time interval.

The principle of the invention will be more fully understood by reference to the following description which is given by way of example and to which the invention is not limited, and to the accompanying drawing in which 16 and 17 represent the two leads of a line terminating in the jack 15.

When a signaling current transmitted over the leads 16 and 17 is received at the equipment, the alternating current relay 3 is energized and by its armature 31 and working contact closes the following circuit for the winding of relay 1: earth, armature 31 and working contact, armature 21 and resting contact, winding of relay 1, resistance 32 and battery.

On account of the presence of condenser 19 at the ends of its winding, relay 1 does not energize immediately. If the time during which relay 3 remains energized, i. e., the time of duration of the signaling current, is less than the charging period of the condenser 19, relay 1 will not energize. When relay 3 releases, condenser 19 discharges through resistance 33 over the circuit: left hand plate of condenser 19, resistance 33, armature 23 and normal contact, armature 31 and normal contact, armature 21 and normal contact, right hand plate of condenser 19.

Suppose now that the signaling current is transmitted for a period of time which is greater than the time taken by 19 to charge, but smaller than the time taken for it to charge and to discharge. In this case relay 1 energizes and closes the circuit for relay 2 over: earth, armature 31 and working contact, armature 12 and working contact, lower winding of relay 2 and battery.

Relay 2 energizes, but although armature 22 closes its contact, it cannot complete the circuit for the signaling lamp 13 since this circuit is broken by the armature 11 of relay 1.

When relay 3 deenergizes the condenser 19 discharges through the winding of relay 1 (the previous discharge circuit being broken down by armature 21 of relay 2) and keeps the said relay energized sufficiently long to allow relay 2 to deenergize, the earth being cut off from the lower winding by armature 31 returning to normal.

In the case in which the duration of the transmission of signaling current is greater than the total time for charging and discharging of condenser 19, relays 1 and 2 energize as has been described in the preceding case. When the condenser has completed its discharge through the winding of relay 1, this relay deenergizes and by its armature 11 closes the circuit for the signaling lamp 13 and for the upper locking winding of relay 2. The circuit for the signaling lamp is: earth, springs 34 and 35 of jack 15, armature 11 and normal contact, armature 22 and working contact, signaling lamp 13, battery. The circuit for the locking winding of relay 2 is: earth, springs 34 and 35 of the jack 15, armature 11 and normal contact, armature 22 and working contact, upper winding of relay 2 and battery. Relay 2 remains energized after relay 3 has deenergized, over the above locking circuit, and the signaling lamp remains alight until the operator plugs in. Contact 34—35 is then opened and this causes the extinction of the lamp 13 and the release of relay 2.

The invention having been described, that which is believed to be new and for which the protection of Letters Patent is desired will be pointed out in the appended claims.

What is claimed is:

1. In a delay device, a relay and an operating circuit therefor, a second relay having a circuit closed by contacts on said first relay, a third relay having a circuit closed by said first and second relays jointly, a locking circuit for said third relay closed through contacts of said first and third relays, contacts in the crcuit of said second relay opened by the operation of said third relay, a second locking circuit for said third relay, including a contact thereon, closed by the deenergization of said second relay, and another circuit in parallel with a part of said second locking circuit for operating a translating device.

2. In a delay system, a relay and an energizing circuit therefor, a second relay energized through contacts closed responsive to the energization of said first relay, a third relay energized by said first and second relays jointly, said third relay having contacts for locking itself under control of said first relay and for deenergizing said second relay, a locking circuit for said third relay including contacts closed by the deenergization of said second relay, a condenser for delaying the energization and deenergization of said relay, and a circuit closed responsive to the closure of said locking circuit for operating a translating device.

3. In combination, a first relay and an operating circuit therefor, a second relay, a condenser bridging the winding of said second relay, a third relay, an output control conductor, contacts closed by the operation of said first relay for completing an energizing circuit for said second relay, said second relay made slow to operate due to the time consumed in charging said condenser, contacts closed by said second relay for operating said third relay, contacts closed by the operation of said third relay for completing a holding circuit for itself independent of the contacts on said second relay and for simultaneously opening the energizing circuit of said second relay, said second relay made slow to release due to the time consumed in discharging said condenser, contacts closed by said third relay for preparing a multiple circuit including a second holding circuit for said third relay and said output control conductor, and means responsive to the restoration of said second relay for completing said multiple circuit.

4. A combination as claimed in claim 3, in which the restoration of said first relay at any time prior to the restoration of said second relay prevents the completion of said multiple circuit.

5. Apparatus for producing time delayed operations of mechanisms, comprising in combination, a first relay, a line over which an energizing circuit is completed for said first relay, a second relay, a condenser shunting the winding of said second relay adapted to make the relay slow to operate while the condenser is taking a charge and slow to release while the condenser is being discharged, a third relay having two windings, an output control conductor, contacts on said third relay for preparing a locking circuit including the first of said third relay windings in multiple with said output control conductor; means responsive to the energization of said first relay for charging said condenser and for operating said second relay, contacts on said second relay for completing an operating circuit for said third relay over a circuit including the second of said third relay windings, said third relay operating said contacts to prepare said locking circuit, other contacts on said third relay for transferring the initial energizing circuit of said second relay to said third relay, said condenser discharging when the initial circuit of second relay is transferred, and means controlled when said second relay restores for completing said locking circuit.

FERNAND PIERRE GOHOREL.